United States Patent
Namba et al.

(10) Patent No.: US 10,873,226 B2
(45) Date of Patent: Dec. 22, 2020

(54) ROTARY ELECTRIC MACHINE

(71) Applicant: Toyota Jidosha Kabushiki Kaisha, Toyota (JP)

(72) Inventors: Masafumi Namba, Nagakute (JP); Shinya Urata, Nagakute (JP); Hideo Nakai, Nagakute (JP); Hiroyuki Hattori, Okazaki (JP); Shinji Wakamatsu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 13 days.

(21) Appl. No.: 15/879,843

(22) Filed: Jan. 25, 2018

(65) Prior Publication Data

US 2018/0219439 A1 Aug. 2, 2018

(30) Foreign Application Priority Data

Jan. 27, 2017 (JP) .................. 2017-013145

(51) Int. Cl.
| | |
|---|---|
| *H02K 1/27* | (2006.01) |
| *H02K 19/10* | (2006.01) |
| *H02K 1/16* | (2006.01) |
| *H02K 1/18* | (2006.01) |
| *H02K 3/12* | (2006.01) |

(Continued)

(52) U.S. Cl.
CPC ............. *H02K 1/2766* (2013.01); *H02K 1/16* (2013.01); *H02K 1/18* (2013.01); *H02K 3/12* (2013.01); *H02K 3/28* (2013.01); *H02K 16/02* (2013.01); *H02K 19/10* (2013.01); *H02K 21/145* (2013.01); *H02K 2213/03* (2013.01)

(58) Field of Classification Search
CPC .......... H02K 1/2766; H02K 1/16; H02K 3/16; H02K 1/18; H02K 3/28; H02K 16/02; H02K 19/10; H02K 21/145
USPC ................................................ 310/49.19, 208
See application file for complete search history.

(56) References Cited

U.S. PATENT DOCUMENTS

| | | | | |
|---|---|---|---|---|
| 2008/0136284 A1* | 6/2008 | Fujii | ......................... | H02K 3/12 310/214 |
| 2009/0091204 A1* | 4/2009 | Koshiba | ................. | H02K 16/02 310/114 |

(Continued)

FOREIGN PATENT DOCUMENTS

| | | |
|---|---|---|
| CN | 101847919 B | 1/2013 |
| EP | 0945965 A2 | 9/1999 |

(Continued)

*Primary Examiner* — Terrance L Kenerly
(74) *Attorney, Agent, or Firm* — Dinsmore & Shohl LLP (57) ABSTRACT

A rotary electric machine includes an annular stator, an inner rotor, an outer rotor and a toroidal coil. The annular stator includes inner teeth protruding radially inward and outer teeth protruding radially outward. The inner rotor faces a radially inner side of the annular stator. The outer rotor faces a radially outer side of the annular stator. The toroidal coils are arranged in each inner slot between any adjacent two of the inner teeth and a corresponding one outer slot between adjacent two of the outer teeth. The total number of the plurality of outer slots is larger than the total number of the plurality of inner slots. The number of the coils arranged in all the outer slots is larger than or equal to the number of the coils arranged in all the inner slots.

5 Claims, 6 Drawing Sheets (51) Int. Cl.
*H02K 3/28* (2006.01)
*H02K 16/02* (2006.01)
*H02K 21/14* (2006.01)

(56) References Cited

U.S. PATENT DOCUMENTS

| | | | |
|---|---|---|---|
| 2009/0134735 A1* | 5/2009 | Yoshikawa | H02K 16/02 |
| | | | 310/198 |
| 2010/0123426 A1 | 5/2010 | Nashiki et al. | |
| 2014/0091662 A1 | 4/2014 | Kim | |
| 2015/0180298 A1* | 6/2015 | Horst | H02K 1/2786 |
| | | | 310/91 |
| 2018/0301951 A1* | 10/2018 | Horst | H02K 21/16 |

FOREIGN PATENT DOCUMENTS

| | | |
|---|---|---|
| JP | 2007185012 A | 7/2007 |
| JP | 2008113480 A | 5/2008 |
| JP | 2011167066 A | 8/2011 |
| JP | 2013-229958 A | 11/2013 |

\* cited by examiner

ROTARY ELECTRIC MACHINE

CROSS-REFERENCE TO RELATED APPLICATIONS

This application claims priority to Japanese Patent Application No. 2017-013145 filed on Jan. 27, 2017, which is incorporated herein by reference in its entirety including the specification, drawings and abstract.

BACKGROUND

1. Technical Field

The disclosure relates to a rotary electric machine and, more particularly, to a rotary electric machine including a rotor provided on a radially inner side of an annular stator and a rotor provided on a radially outer side of the annular stator.

2. Description of Related Art

Conventionally, there has been suggested a toroidal-winding rotary electric machine including a rotor provided on a radially inner side of a stator and a rotor provided on a radially outer side of the stator.

Figure 11:
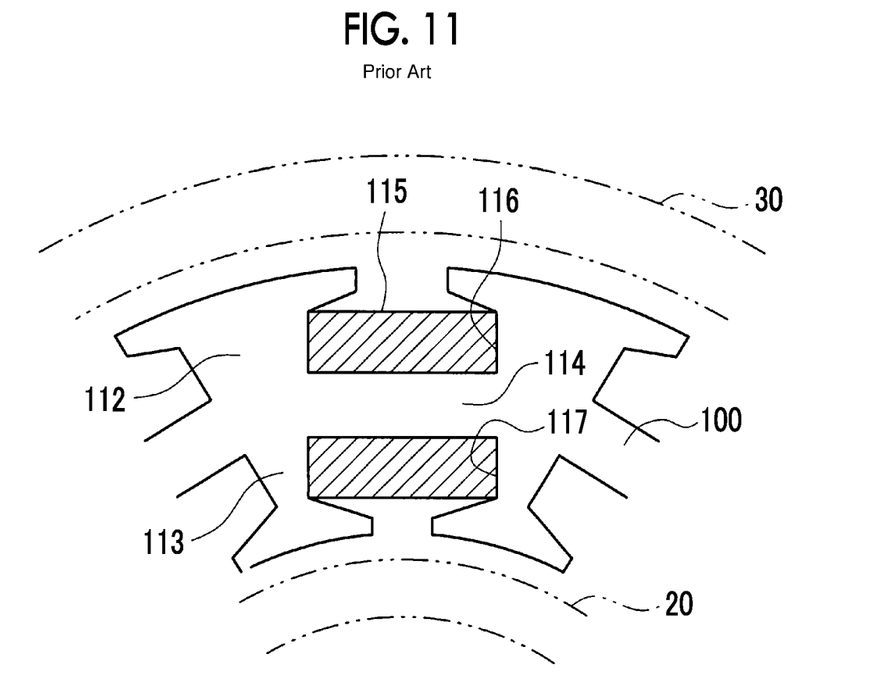
FIG. 11 is a view of part of an existing rotary electric machine in a circumferential direction when viewed from one side in an axial direction.

FIG. 11 shows the configuration of a motor that is an existing rotary electric machine described in Japanese Patent Application Publication No. 2007-185012 (JP 2007-185012 A). The motor includes a stator 100, an inner rotor 20 and an outer rotor 30.

The stator 100 is formed of a stator yoke 114, outer teeth 112 and inner teeth 113. The outer teeth 112 and the inner teeth 113 are provided on the stator yoke 114. Three-phase toroidal coils 115 are wound around the stator yoke 114. The coils 115 are connected to one another in star connection or delta connection. FIG. 11 shows only one phase coil 115 out of the three-phase coils.

The inner rotor 20 is rotatably held inside the stator 100. The inner rotor 20 is formed of an inner yoke and an inner permanent magnet. The outer rotor 30 is rotatably held outside the stator 100. The outer rotor 30 is formed of an outer yoke and an outer permanent magnet. The inner rotor 20 and the outer rotor 30 each rotate under the influence of magnetic fields that are formed by current flowing through each of the coils 115. Each of the inner rotor 20 and the outer rotor 30 is a surface magnet-type rotor in which the permanent magnet is arranged on the surface of the yoke.

The outer teeth 112 protrude radially outward from the stator yoke 114. The inner teeth 113 protrude radially inward from the stator yoke 114. The inner teeth 113 are provided in the same number as the outer teeth 112. An outer slot 116 is provided between any adjacent two of the outer teeth 112 in order to insert the coil 115. An inner slot 117 is provided between any adjacent two of the inner teeth 113 in order to insert the coil 115. The shape and area of each outer slot 116 are set so as to be the same as the shape and area of each inner slot 117.

Japanese Patent Application Publication No. 2008-113480 (JP 2008-113480 A) describes that, in a motor including a rotor provided on a radially inner side of a stator and a rotor provided on a radially outer side of the stator, outer teeth are provided on an outer side of a substantially annular yoke of the stator and inner teeth are provided on an inner side of the substantially annular yoke of the stator. Coils are arranged around the yoke in toroidal winding. A straight line that connects the center point of the distal end of each of the outer teeth with the center point of the distal end of each of the inner teeth and a straight line that connects the center of the motor with the center point of the distal end of each of the inner teeth are shifted from each other by a predetermined angle. That is, these straight lines are arranged in a skew position.

SUMMARY

With the configuration described in JP 2007-185012 A, when the area and shape of each outer slot 116 are set so as to be the same as the area and shape of each inner slot 117, the coil 115 is wound in normal winding. As a result, a space factor is improved, so a copper loss is reduced.

However, with the configuration described in JP 2007-185012 A, the length of each of the outer teeth in the circumferential direction is considerably larger than the length of each of the inner teeth in the circumferential direction. Thus, among the three-phase coils that are arranged in the outer slots, a spacing between any adjacent two phases increases. For this reason, a cogging torque in the motor is easy to increase.

Moreover, the sum of the lengths of the distal end faces of the outer teeth in the circumferential direction, which is the length of the outer periphery of the stator, is larger than the sum of the lengths of the distal end faces of the inner teeth in the circumferential direction, which is the length of the inner periphery of the stator. Thus, a torque generating face at the radially outer side of the stator is larger than a torque generating face at the radially inner side of the stator, so a torque and torque fluctuations are easy to increase. For this reason, a cogging torque in the motor is further easy to increase. A torque ripple is also easy to increase.

On the other hand, with the configuration described in JP 2008-113480 A, on the basis of the relation between a cogging torque of the outer rotor and an angle of the outer rotor with respect to the stator and the relation between a cogging torque of the inner rotor and an angle of the inner rotor with respect to the stator, a predetermined angle at which the sum of the outer cogging torque and the inner cogging torque is reduced is determined. However, in the case of this configuration as well, the spacing between any adjacent two-phase coils is large in the three-phase coils that are arranged in the respective outer slots of the stator. Since the torque generating face at the radially outer side of the stator is larger than the torque generating face at the radially inner side of the stator, a torque increases. Thus, a cogging torque and a torque ripple are easy to increase.

The disclosure provides a rotary electric machine that includes a rotor provided on a radially inner side of a stator and a rotor provided on a radially outer side of the stator and that reduces a cogging torque and a torque ripple.

An aspect of the disclosure provides a rotary electric machine. The rotary electric machine includes an annular stator, an inner rotor, an outer rotor and a toroidal coil. The annular stator includes a plurality of inner teeth and a plurality of outer teeth. The plurality of inner teeth protrude radially inward. The plurality of outer teeth protrude radially outward. The inner rotor faces a radially inner side of the annular stator. The outer rotor faces a radially outer side of the annular stator. The toroidal coil is arranged in each inner slot between any adjacent two of the inner teeth and a corresponding one outer slot between adjacent two of the outer teeth. The total number of the plurality of outer slots is larger than the total number of the plurality of inner slots.

The number of the coils arranged in all the outer slots is larger than or equal to the number of the coils arranged in all the inner slots.

With the rotary electric machine according to the aspect of the disclosure, both a cogging torque and a torque ripple are reduced in the rotary electric machine including the rotor provided on the radially inner side of the annular stator and the rotor provided on the radially outer side of the annular stator.

In the rotary electric machine, the ratio of the total number of the plurality of outer slots to the total number of the plurality of inner slots may be two to one. The number of the coils arranged in all the outer slots may be equal to the number of the coils arranged in all the inner slots.

In the rotary electric machine, the plurality of outer slots may be configured such that a first outer slot and a second outer slot are alternately arranged in a circumferential direction. The ratio of the total number of the plurality of outer slots to the total number of the plurality of inner slots may be two to one. The toroidal coil is arranged in each of the inner slots and the first outer slots. A distributed coil may be arranged in each of the second outer slots. The number of the coils arranged in all the outer slots may be larger than the number of the coils arranged in all the inner slots.

In the rotary electric machine, each first outer slot may be arranged at the same position in the circumferential direction as a corresponding one of the inner slots. Each second outer slot may be arranged at a different position in the circumferential direction with respect to a corresponding one of the inner slots.

In the rotary electric machine, a flat wire coil having a rectangular cross section may be arranged in each first outer slot as the coil. A round wire coil having a circular cross section is arranged in each second outer slot as the coil.

In the rotary electric machine, the first outer slots and the second outer slots may be configured such that two of the first outer slots and two of the second outer slots are alternately arranged in the circumferential direction at the radially outer side of the annular stator.

In the rotary electric machine, the distributed coil arranged in each second outer slot may be wound around a plurality of the outer teeth between the second outer slot and another one of the second outer slots.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings. In the following description, like reference numerals denote equivalent components in all the drawings.

Figure 1:
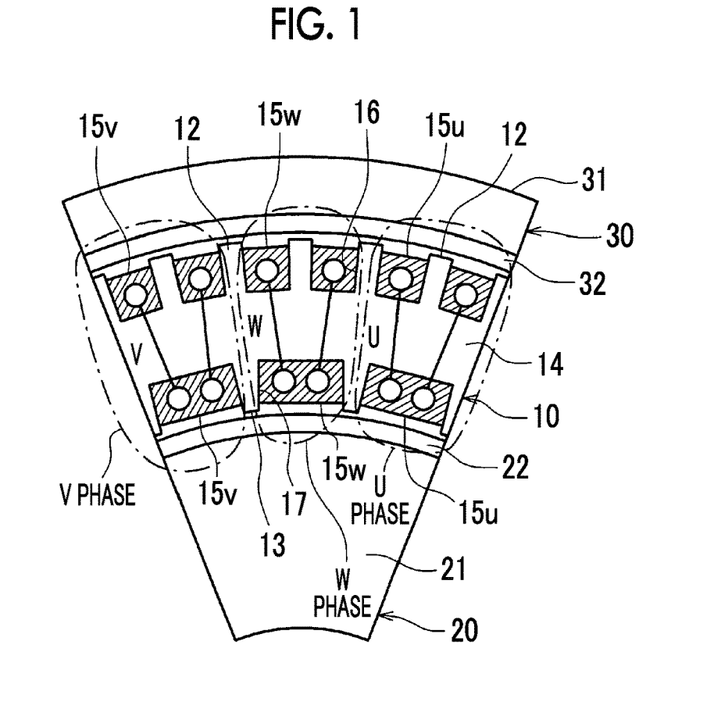
FIG. 1 is a view of part of a rotary electric machine in a circumferential direction according to an embodiment when viewed from one side in an axial direction.

FIG. 1 is a view of part of a rotary electric machine in a circumferential direction according to the embodiment when viewed from one side in an axial direction. The rotary electric machine includes an annular stator 10, an inner rotor 20 and an outer rotor 30.

The rotary electric machine is a permanent-magnet synchronous motor that is driven by three-phase alternating current. The rotary electric machine is used as a motor that drives an electric vehicle or a hybrid vehicle or used as a generator or used as a motor generator having both functions.

The annular stator 10 includes a stator yoke 14, a plurality of outer teeth 12 and a plurality of inner teeth 13. The plurality of outer teeth 12 protrude in a radial direction from the outer periphery of the stator yoke 14. The plurality of inner teeth 13 protrude in the radial direction from the inner periphery of the stator yoke 14. Three U-phase, V-phase and W-phase coils 15$u$, 15$v$, 15$w$ are wound around the stator yoke 14. The coils 15$u$, 15$v$, 15$w$ are toroidal coils, and are connected in star connection or delta connection. In the following description, the radial direction means a radiation direction that is the radial direction of the annular stator 10, and the circumferential direction means a direction along a circular shape about the central axis of the annular stator 10. The axial direction means a direction along the central axis of the annular stator 10. In the following description, the annular stator 10 is referred to as stator 10. The coils 15$u$, 15$v$, 15$w$ may be referred to as coils 15.

The inner rotor 20 is rotatably supported inside the stator 10. The inner rotor 20 includes an inner yoke 21 and an inner permanent magnet 22. On the other hand, the outer rotor 30 is rotatably supported outside the stator 10. The outer rotor 30 includes an outer yoke 31 and an outer permanent magnet 32. The inner rotor 20 and the outer rotor 30 each rotate under the influence of magnetic fields that are formed in the stator 10 by current flowing through the coils 15. The inner permanent magnet 22 is arranged on the surface (outer periphery) of the inner yoke 21, and the outer permanent magnet 32 is arranged on the surface (inner periphery) of the outer yoke 31. In FIG. 1, the inner permanent magnet 22 and the outer permanent magnet 32 each are shown in a circular arc frame shape; however, actually, a plurality of permanent magnets having different polarities are alternately arranged in each of the permanent magnets 22, 32 in the circumferential direction. Any adjacent permanent magnets in the circumferential direction are magnetized in opposite directions in the radial direction. Thus, an N-pole and an S-pole are alternately arranged at the outer periphery of the inner permanent magnet 22 in the circumferential direction. Similarly, an N-pole and an S-pole are alternately arranged at the inner periphery of the outer permanent magnet 32 in the circumferential direction.

In the plurality of outer teeth 12 that protrude radially outward from the stator yoke 14, an outer slot 16 is provided between any adjacent two of the outer teeth 12. In the inner teeth 13 that protrude radially inward from the stator yoke 14 and that are half of the outer teeth 12 in number, an inner slot 17 is provided between any adjacent two of the inner teeth 13.

The toroidal coil 15 is arranged in each outer slot 16 and a corresponding one of the inner slots 17, and is wound around the stator yoke 14. In FIG. 1, the coils 15 are schematically shown by hatching. In FIG. 1, the straight lines that respectively connect the outer slots 16 with the corresponding inner slots 17 schematically represent that a plurality of the coils 15 inside the outer slots 16 and a plurality of the coils 15 inside the corresponding inner slots 17 are connected at the coil ends.

In addition, the ratio of the total number of the outer slots 16 to the total number of the inner slots 17 is two to one, and the total number of the outer slots 16 is twice as large as the total number of the inner slots 17. The coils 15 that serve as main components for generating a torque are arranged in the outer slots 16. In a cross-sectional shape of the stator 10, taken along a plane perpendicular to the axial direction, a rectangle that is a shape obtained by connecting all the outer slots 16 in the circumferential direction and a rectangle that is a shape obtained by connecting all the inner slots 17 in the circumferential direction have the same shape and area.

Thus, the total number of the plurality of outer slots 16 is larger than the total number of the plurality of inner slots 17. The number of the coils 15 arranged in all the outer slots 16 is larger than or equal to the number of the coils 15 arranged in all the inner slots 17. More specifically, of the U, V, W-phase coils 15, the coil 15 arranged in one of the inner slots 17 is connected to the coils 15 respectively provided in the corresponding two outer slots 16 so as to be distributed between the two outer slots 16 shifted to both sides in the circumferential direction. The number of the coils 15 arranged in all the outer slots 16 is equal to the number of the coils 15 arranged in all the inner slots 17. The number of the coils 15 means the number of the coils 15 arranged in the corresponding outer slot 16 or inner slot 17 in the cross section of the stator 10, taken along a plane perpendicular to the axial direction.

A flat wire coil having a rectangular cross section is desirably used as the coil 15. With this desirable configuration, the space factor of the coil 15 in each of the slots 16, 17 is further improved. A round wire coil having a circular cross section may also be used as the coil 15.

With the above-described rotary electric machine, the total number of the plurality of outer slots 16 is larger than the total number of the plurality of inner slots 17, and the number of the coils 15 arranged in all the outer slots 16 is larger than or equal to the number of the coils 15 arranged in all the inner slots 17. Thus, as for the coils 15 arranged in the outer slots 16, the spacing in the circumferential direction between any adjacent two different phase coils 15 reduces, so a harmonic magnetic flux reduces. As a result, a cogging torque at the outer rotor 30 side is reduced. Thus, a cogging torque in the rotary electric machine is reduced as a whole. In addition, a torque ripple in the rotary electric machine is reduced because of a similar reason.

Furthermore, a shape obtained by connecting all the inner slots 17 in the circumferential direction and a shape obtained by connecting all the outer slots 16 in the circumferential direction have the same shape and area. Thus, when the toroidal coil 15 is arranged in each of the outer slots 16 and a corresponding one of the inner slots 17, the space factor of the coil 15 in each of the slots 16, 17 is improved. Thus, a copper loss is reduced, so the efficiency of the rotary electric machine is improved. When the flat wire coil is used as the coil 15, the space factor is further improved.

Figure 2:
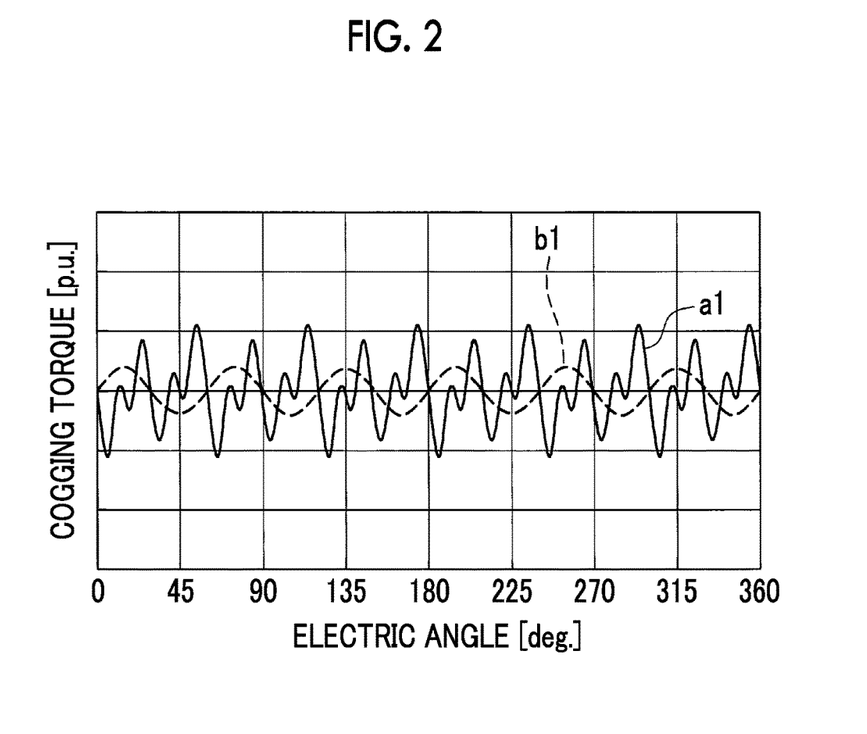
FIG. 2 is a graph that shows the relation between a cogging torque and an electrical angle that is a rotation angle of each of outer and inner rotors with respect to a stator in the rotary electric machine according to the embodiment.

FIG. 2 is a view that shows the relation between a cogging torque and an electrical angle that is a rotation angle of each of the outer rotor 30 and inner rotor 20 with respect to the stator 10 in the rotary electric machine according to the embodiment. In FIG. 2, the continuous line a1 represents the relation between a cogging torque of the outer rotor 30 and an electrical angle of the outer rotor 30 with respect to the stator 10. The broken line b1 represents the relation between a cogging torque of the inner rotor 20 and an electrical angle of the inner rotor 20 with respect to the stator 10. FIG. 2 is a graph based on the result of magnetic field analysis.

As shown in FIG. 2, a cogging torque of the outer rotor 30 at the radially outer side is larger than a cogging torque of the inner rotor 20 at the radially inner side; however, the difference is reduced, and both the cogging torques are reduced. Thus, a cogging torque in the rotary electric machine is reduced. In FIG. 2, a cogging torque at the radially outer side and a cogging torque at the radially inner side are indicated as a relative magnitude relation.

Figure 3:
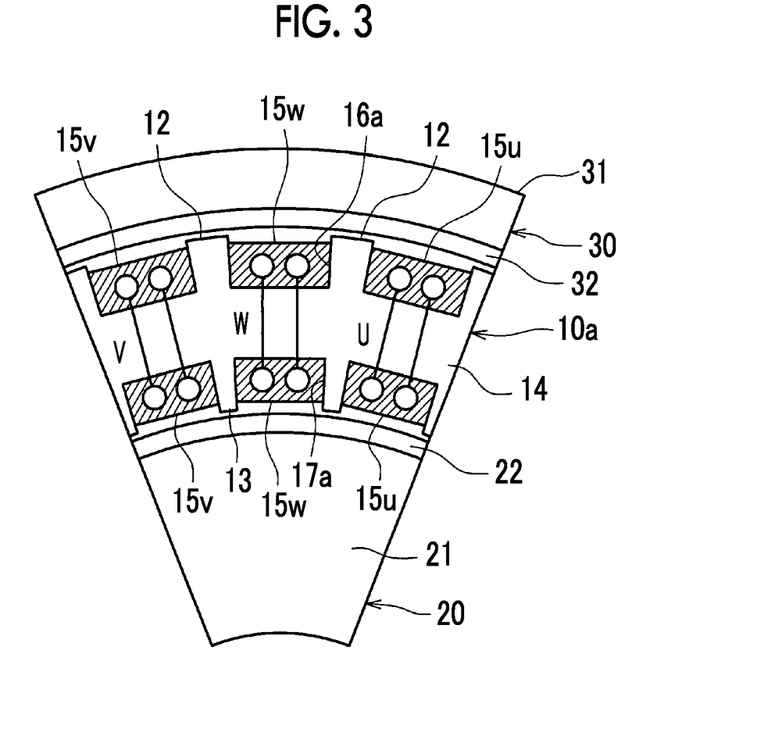
FIG. 3 is a view of part of a rotary electric machine in a circumferential direction according to a first comparative embodiment when viewed from one side in an axial direction.

On the other hand, FIG. 3 is a view of part of a rotary electric machine in the circumferential direction according to a first comparative embodiment when viewed from one side in the axial direction. In the first comparative embodiment shown in FIG. 3, different from the embodiment shown in FIG. 1 and FIG. 2, the total number of a plurality of outer slots 16*a* in a stator 10*a* is equal to the total number of a plurality of inner slots 17*a* in the stator 10*a*. In addition, the number of the coils 15 arranged in all the outer slots 16*a* is equal to the number of the coils 15 arranged in all the inner slots 17*a*. Furthermore, the shape and area of each inner slot 17*a* are respectively the same as the shape and area of each outer slot 16*a*. The other configuration is similar to that of the embodiment shown in FIG. 1.

In the above first comparative embodiment, as shown in FIG. 3, in the coils 15 arranged in the outer slots 16*a*, the spacing in the circumferential direction between any adjacent two different phase coils 15 increases as compared to the embodiment shown in FIG. 1, so a cogging torque at the radially outer side is easy to increase. Thus, a cogging torque in the rotary electric machine is easy to increase as a whole.

In addition, a torque ripple in the rotary electric machine is also easy to increase because of a similar reason.

Figure 4:
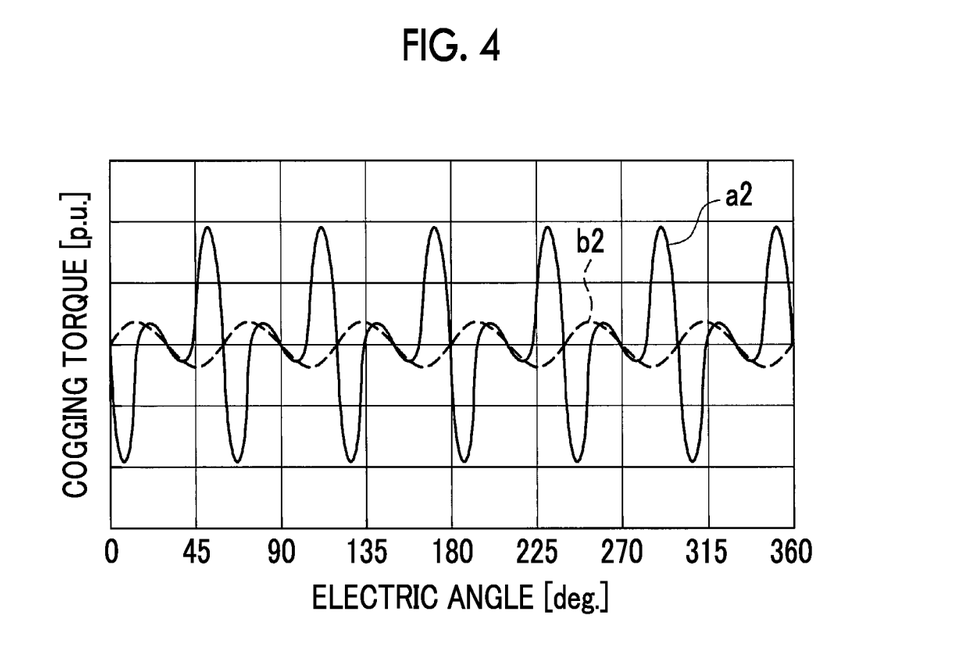
FIG. 4 is a graph that shows the relation between a cogging torque and an electrical angle that is a rotation angle of each of outer and inner rotors with respect to a stator in the rotary electric machine according to the first comparative embodiment.

FIG. 4 is a graph that shows the relation between a cogging torque and an electrical angle that is a rotation angle of each of the outer rotor 30 and inner rotor 20 with respect to the stator 10a in the rotary electric machine according to the first comparative embodiment. In FIG. 4, the meanings of the continuous line a2 and broken line b2 are the same as the meanings of the continuous line a1 and broken line b1 in FIG. 2. FIG. 4 is a graph based on the result of magnetic field analysis.

Figure 5:
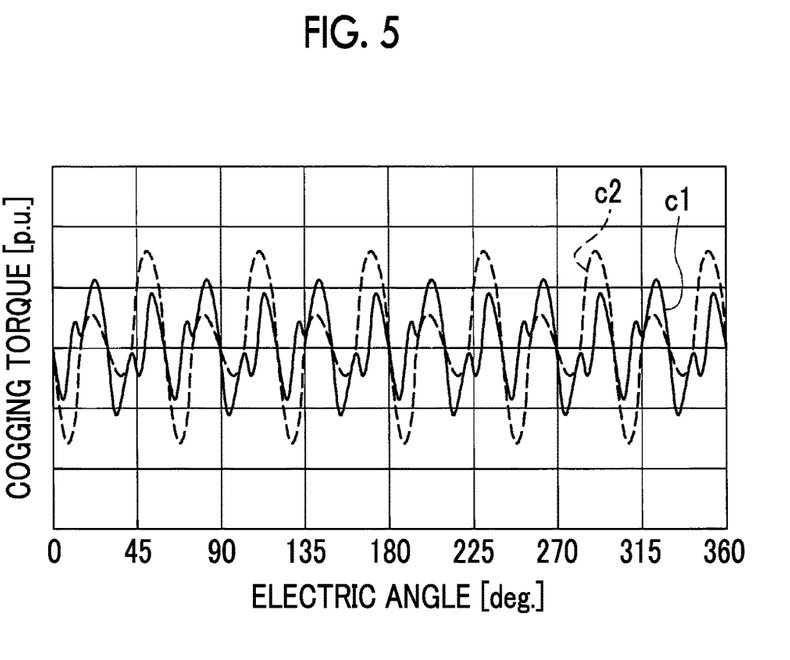
FIG. 5 is a view that is a graph in which a resultant cogging torque in the rotary electric machine according to the embodiment is compared with a resultant cogging torque in the rotary electric machine according to the first comparative embodiment.

FIG. 5 is a graph in which a resultant cogging torque in the rotary electric machine according to the embodiment is compared with a resultant cogging torque in the rotary electric machine according to the first comparative embodiment. The resultant cogging torque corresponds to the sum of a cogging torque at the radially inner side and a cogging torque at the radially outer side. In FIG. 5, the continuous line c1 represents a resultant cogging torque of the rotary electric machine according to the embodiment, and the broken line c2 represents a resultant cogging torque of the rotary electric machine according to the first comparative embodiment. As shown in FIG. 5, the resultant cogging torque according to the embodiment is reduced as compared to the resultant cogging torque according to the comparative embodiment.

Figure 6:
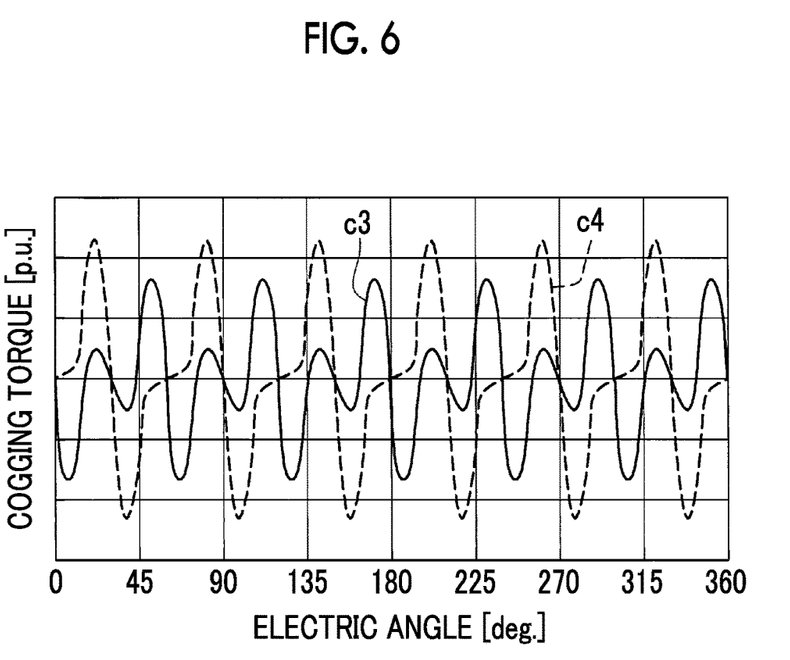
FIG. 6 is a graph in which a resultant cogging torque in the rotary electric machine according to the first comparative embodiment is compared with a resultant cogging torque in a rotary electric machine according to a second comparative embodiment.

FIG. 6 is a graph in which a resultant cogging torque in the rotary electric machine according to the first comparative embodiment is compared with a resultant cogging torque in a rotary electric machine according to a second comparative embodiment. The rotary electric machine according to the second comparative embodiment has a similar configuration to the configuration described in JP 2008-113480 A. Specifically, in the rotary electric machine according to the second comparative embodiment, in the case where the rotary electric machine according to the first comparative embodiment shown in FIG. 3 is viewed from one side in the axial direction, a second straight line defined for the rotary electric machine and the inner teeth is inclined with respect to a first straight line defined for the outer teeth and the inner teeth. The first straight line is a straight line that connects the center point of the distal end of each of the outer teeth 12 with the center point of the distal end of a corresponding one of the inner teeth 13. The second straight line is a straight line that connects the center point of the rotary electric machine with the center point of the distal end of each of the inner teeth 13. The arrangement relation between the outer teeth 12 and the inner teeth 13 is regulated such that the second straight line is shifted from the first straight line at an inclination of a predetermined angle θ1, that is, the second straight line and the first straight line are arranged in a skew position. The other configuration is similar to that of the first comparative embodiment shown in FIG. 3.

In FIG. 6, the continuous line c3 represents a resultant cogging torque of the rotary electric machine according to the first comparative embodiment, and the broken line c4 represents a resultant cogging torque of the rotary electric machine according to the second comparative embodiment. The continuous line c3 in FIG. 6 is the same as the broken line c2 in FIG. 5. As shown in FIG. 6, the resultant cogging torque (broken line c4) of the second comparative embodiment is further increased as compared to the resultant cogging torque (continuous line c3) of the first comparative embodiment.

Figure 7:
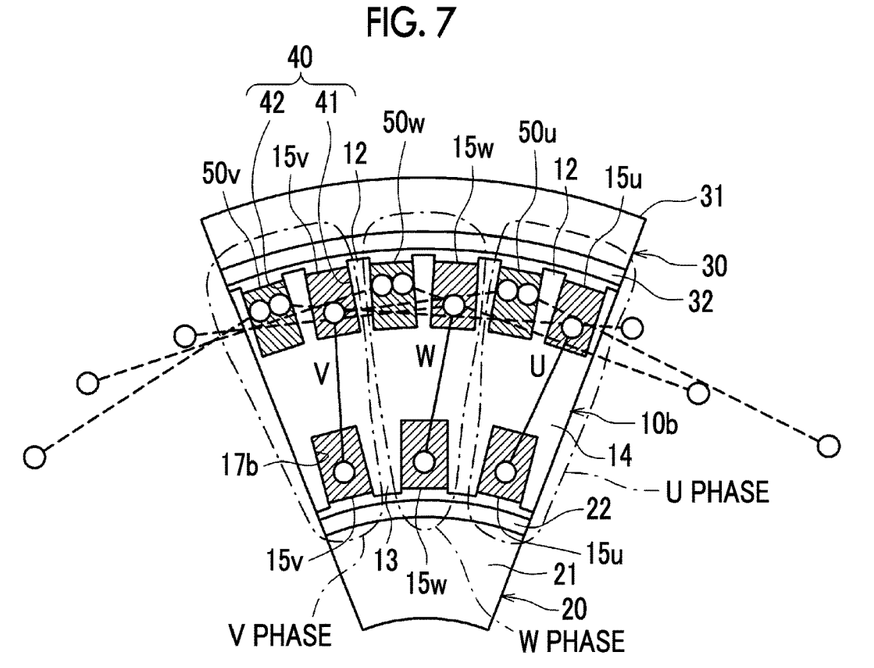
FIG. 7 is a view of part of a rotary electric machine in a circumferential direction according to an alternative embodiment to the embodiment when viewed from one side in an axial direction.

FIG. 7 is a view of part of a rotary electric machine in the circumferential direction according to an alternative embodiment to the embodiment when viewed from one side in the axial direction. In the configuration according to the alternative embodiment shown in FIG. 7, different from the embodiment shown in FIG. 1, a plurality of outer slots 40 provided at the radially outer side of a stator 10b are formed such that a first outer slot 41 and a second outer slot 42 are alternately arranged in the circumferential direction. A plurality of inner slots 17b are provided at the radially inner side of the stator 10b.

The ratio of the total number of the plurality of outer slots 40 to the total number of the plurality of inner slots 17b is two to one. Each first outer slot 41, each second outer slot 42 and each inner slot 17b have substantially the same rectangular shape when viewed from one side in the axial direction. The area of the shape of each first outer slot 41, the area of the shape of each second outer slot 42 and the area of the shape of each inner slot 17b are substantially the same when viewed from one side in the axial direction. Each first outer slot 41, each second outer slot 42 and each inner slot 17b have substantially the same shape in a cross section taken along a plane perpendicular to the axial direction over the entire length in the axial direction. For this reason, in a cross-sectional shape of the rotary electric machine, taken along a plane perpendicular to the axial direction, the sum of the areas of the plurality of outer slots 40 is larger than the sum of the areas of the plurality of inner slots 17b.

Three toroidal U, V, W-phase coils 15u, 15v, 15w are respectively arranged in the first outer slots 41 and the corresponding inner slots 17b. On the other hand, three distributed U, V, W-phase coils 50u, 50v, 50w are respectively arranged in the second outer slots 42. Hereinafter, the coils 50u, 50v, 50w may be referred to as coils 50. In FIG. 7, the toroidal coils 15 and the distributed coils 50 are respectively indicated by different oblique lines. Thus, the number of the coils 15, 50 arranged in all the outer slots 41, 42 is larger than the number of the coils 15 arranged in all the inner slots 17b.

The distributed coil 50 of each phase, arranged in each second outer slot 42, extends from the openings of the second outer slot 42 at both ends in the axial direction toward both sides in the circumferential direction, and are wound around a plurality of the outer teeth 12 between the second outer slot 42 and other two of the second outer slots 42. In FIG. 7, in each distributed coil 50, portions that are arranged at coil ends and that extend in the circumferential direction are indicated by the broken lines. Each distributed coil 50 is desirably formed of a round wire coil. With this configuration, the distributed coils 50 are easy to be wound in complex directions by using twistable round wires.

Each distributed coil 50 is not intensively arranged in one slot but arranged in a plurality of slots in a distributed manner, and the distributed coils 50 are connected to each other via the coil ends in distributed winding. The distributed coil 50 in each second outer slot 42 is wound in a predetermined orientation such that current in the same direction as current flowing through the adjacent toroidal coil 15 of the same phase on one side (right side in FIG. 7) in the circumferential direction flows at the same timing as the toroidal coil 15 of the same phase.

For example, the direction of current flowing through each distributed coil 50 and each toroidal coil 15 will be described in detail with reference to FIG. 7. It is assumed that current in the toroidal coil 15 of one phase in the first outer slot 41 flows from the near side of the drawing sheet toward the far side of the drawing sheet and current in the toroidal coil 15 of the same phase in the inner slot 17b flows from the far side of the drawing sheet toward the near side of the drawing sheet. At this time, current in the distributed coil 50 of the same phase as the above-described one phase and located adjacent to the other side (left side in FIG. 7) of the toroidal coil 15 in the circumferential direction conducts in a direction from the near side of the drawing sheet toward the far side of the drawing sheet.

Where the first outer slot 41 and the second outer slot 42 that are located adjacent to each other in the circumferential direction and in which the coils 15, 50 through which current of the same phase flows are arranged are assumed as one set, a plurality of the sets are arranged in the circumferential direction at the radially outer side of the stator 10b. At this time, the center position between the outer slots 41, 42 in the circumferential direction in each set and the center position of the inner slot 17b in the circumferential direction, in which another portion of the coil 15 that is inserted in the first outer slot 41 of that set is arranged coincide with each other in the circumferential direction.

With the above-configuration, the sum of the areas of the plurality of outer slots 40 is larger than the sum of the areas of the plurality of inner slots 17b. Thus, the number of the coils 15, 50 arranged in all the outer slots 40 is larger than the number of the coils 15 arranged in all the inner slots 17b. The toroidal coil 15 is arranged in each of the first outer slots 41, and the distributed coil 50 is arranged in each of the second outer slots 42. Thus, the amount of magnetic flux that is generated in an outer magnetic path that is formed between the stator 10b and the outer rotor 30 is larger than the amount of magnetic flux that is generated in an inner magnetic path that is formed between the stator 10b and the inner rotor 20. As a result, magnetic saturation in the inner teeth 13 having a shorter circumference as a whole is mostly avoided, so the difference in magnetic saturation between the radially inner side and radially outer side of the stator 10b is reduced. Furthermore, a magnetic flux density in the outer teeth 12 having a longer circumference as a whole is improved. For these reasons, the torque of the rotary electric machine is increased.

As in the case of the embodiment shown in FIG. 1 and FIG. 2, the spacing in the circumferential direction between the coils 15, 50 of different phases, respectively arranged in the outer slots 40, reduces. That is, the spacing in the circumferential direction between any adjacent two sets of the outer slots 41, 42 reduces. Thus, a harmonic magnetic flux reduces, so a cogging torque and a torque ripple at the outer rotor 30 side are reduced, with the result that a cogging torque and a torque ripple in the rotary electric machine as a whole are reduced. The other configuration and operation are similar to those of the embodiment shown in FIG. 1 and FIG. 2.

Figure 8:
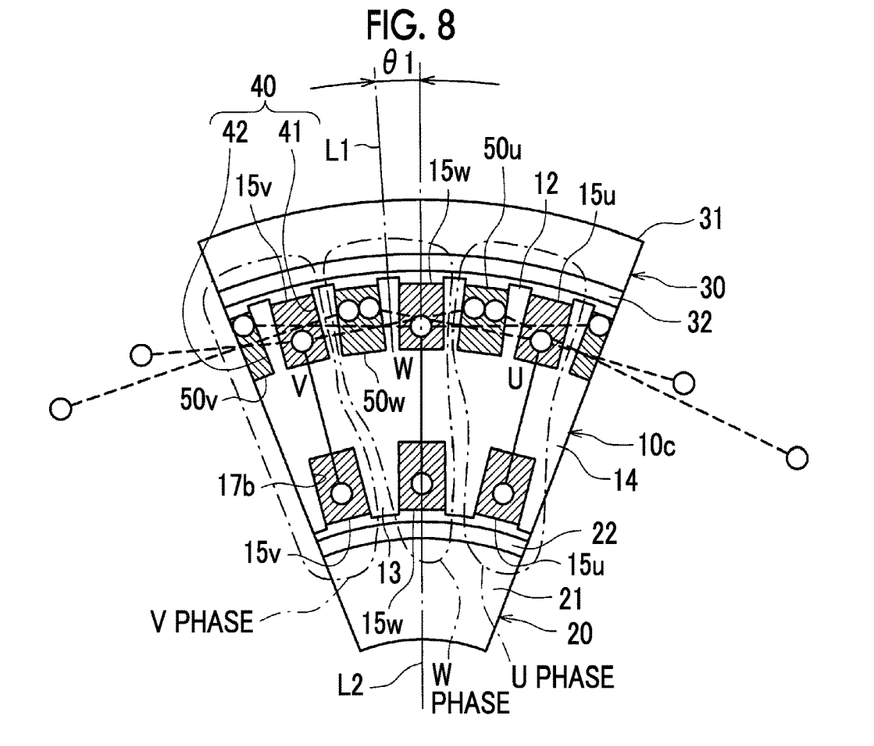
FIG. 8 is a view of part of a rotary electric machine in a circumferential direction according to an alternative embodiment to the embodiment when viewed from one side in an axial direction.

FIG. 8 is a view of part of a rotary electric machine in the circumferential direction according to an alternative embodiment to the embodiment when viewed from one side in the axial direction. In the configuration according to the alternative embodiment shown in FIG. 8, different from the configuration shown in FIG. 7, each first outer slot 41 of a stator 10c is arranged at the same position in the circumferential direction as a corresponding one of the inner slots 17b. On the other hand, each second outer slot 42 is arranged at a different position in the circumferential direction with respect to a corresponding one of the inner slots 17b. Thus, the center position (position indicated by L1) of each set of the outer slots 41, 42 is shifted in the circumferential direction from the center position (position indicated by L2) of a corresponding one of the inner slots 17b in the circumferential direction, in which another portion of the coil 15 inserted in the first outer slot 41 of that set is arranged. Since each first outer slot 41 is arranged at the same position in the circumferential direction as a corresponding one of the inner slots 17b, the toroidal coil 15 just needs to be wound in substantially the radial direction of the stator 10c so as to be arranged in the first outer slot 41 and the inner slot 17b. Thus, the coil 15 becomes easy to be wound.

Desirably, each toroidal coil 15 is formed of a flat wire coil. With this desirable configuration, the toroidal coil 15 is easy to be aligned, and the space factor of the coil 15 in each of the first outer slots 41 and a corresponding one of the inner slots 17b is improved. When each first outer slot 41 and a corresponding one of the inner slots 17b are arranged at the same position in the circumferential direction as in the case of the configuration shown in FIG. 8, it is remarkably effective that the coil 15 is easy to be wound in the case where the flat wire coil 15 is arranged in each of the first outer slots 41 and a corresponding one of the inner slots 17b. At this time, since the toroidal coil 15 is allowed to be wound so as to be further closer to the stator 10c, the coil ends are reduced. In addition, the center position (position indicated by L1) between the outer slots 41, 42 of each set in the circumferential direction is shifted in the circumferential direction from the center position (position indicated by L2) of a corresponding one of the inner slots 17b in the circumferential direction, in which another portion of the coil 15 that is inserted in the first outer slot 41 of that set is arranged. In FIG. 8, the alternate long and short dashes line that extends in the radial direction and that represents L1 is shifted from the alternate long and short dashes line that extends in the radial direction and that represents L2 at an inclination of the predetermined angle θ1. Here, a cogging torque that is a torque that is generated from magnetic interaction between the inner rotor 20 and the radially inner side of the stator 10c is defined as a radially inner-side cogging torque. A cogging torque that is a torque that is generated from magnetic interaction between the outer rotor 30 and the radially outer side of the stator 10c is defined as a radially outer-side cogging torque. In this case, by appropriately selecting the predetermined angle θ1, the configuration in which the radially inner-side cogging torque and the radially outer-side cogging torque cancel out each other is obtained. For example, in order to select the predetermined angle θ1, while θ1 is being changed, the relation between the rotation speed of each of the inner and outer rotors 20, 30 and the radially inner-side and radially outer-side cogging torques is obtained by executing simulation. Thus, θ1 that gives a small cogging torque in the rotary electric machine as a whole is obtained. For this reason, the cogging torque of the rotary electric machine is reduced. For a similar reason, a torque ripple of the rotary electric machine is also reduced. The other configuration and operation are similar to those of the configuration shown in FIG. 7.

Figure 9:
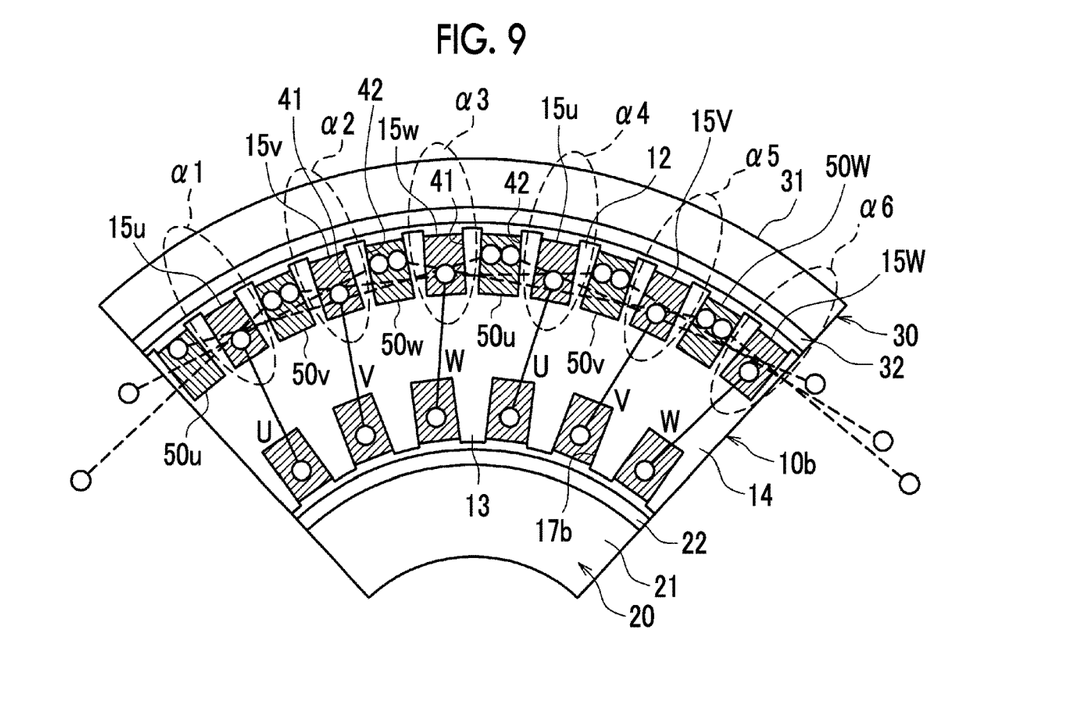
FIG. 9 is a view for illustrating that coil ends increase in the configuration shown in FIG. 7 and is a view that shows a longer part of the rotary electric machine in the circumferential direction than the part of the rotary electric machine shown in FIG. 7.

FIG. 9 is a view for illustrating that the coil ends increase in the configuration shown in FIG. 7, and is a view in which the length of part of the rotary electric machine shown in FIG. 7 in the circumferential direction is extended. In the configuration shown in FIG. 7 and FIG. 9, as described above, the distributed coil 50 arranged in each second outer slot 42 extends from the openings at both ends of the second outer slot 42 in the axial direction toward both sides in the circumferential direction and are wound around the plurality of outer teeth 12 between the second outer slot 42 and other two second outer slots 42.

In such a configuration shown in FIG. 7 and FIG. 9, as indicated by portions surrounded by broken-line ellipses α1, α2, . . . , α6 in FIG. 9, three broken lines that represent the distributed coils 50 each overlap the first outer slot 41 in which the toroidal coil 15 is arranged. This means that, in each portion indicated by the broken-line ellipse, the distributed coils 50 of three different phases are arranged outside the coil ends of the toroidal coil 15. Therefore, with the configuration shown in FIG. 7 and FIG. 9, the coil ends tend to increase. Such a situation also applies to the configuration shown in FIG. 8. Next, a configuration according to an alternative embodiment, which will be described with reference to FIG. 10, is made in order to reduce the coil ends under such a situation.

Figure 10:
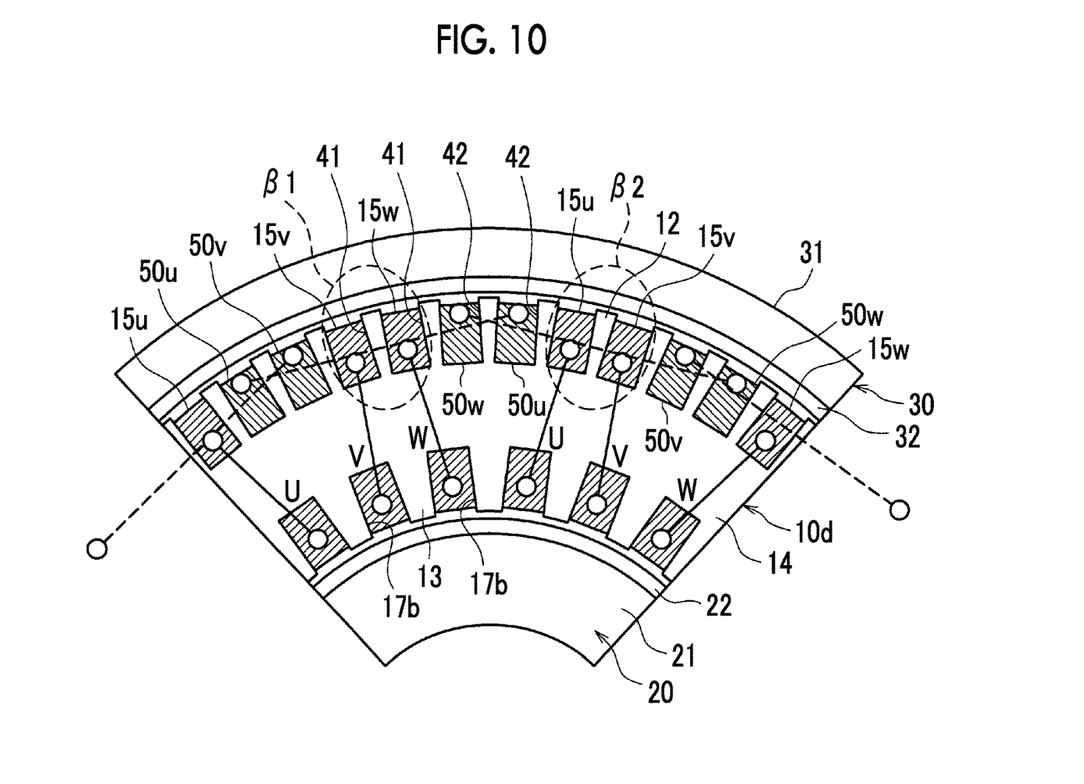
FIG. 10 is a view of part of a rotary electric machine in a circumferential direction according to an alternative embodiment to the embodiment when viewed from one side in an axial direction.

FIG. 10 is a view of part of a rotary electric machine in the circumferential direction according to an alternative embodiment to the embodiment when viewed from one side in the axial direction. In the configuration according to the alternative embodiment shown in FIG. 10, different from the case of the configuration shown in FIG. 7 and FIG. 9, adjacent two of the first outer slots 41 and adjacent two of the second outer slots 42 are alternately arranged in the circumferential direction at the radially outer side of a stator 10d. Thus, the configuration shown in FIG. 10 differs from the configuration shown in FIG. 9 in the order in which the plurality of first outer slots 41 and the plurality of second outer slots 42 are arranged in the circumferential direction of the stator 10d.

In addition, the distributed coil 50 arranged in each second outer slot 42 extends from the openings at both ends of the second outer slot 42 in the axial direction toward only one side or the other side in the circumferential direction, and is wound around the plurality of outer teeth 12 between the second outer slot 42 and another one of the second outer slots 42. Thus, the distributed coil 50 arranged in each second outer slot 42 is wound around the plurality of outer teeth 12 between the second outer slot 42 and only another one of the second outer slots 42.

With the above configuration, a revolving magnetic field that is generated in the stator 10d is the same as the revolving magnetic field of the configuration shown in FIG. 9. On the other hand, with the configuration shown in FIG. 10, since the two first outer slots 41 and the two second outer slots 42 are alternately arranged in the circumferential direction, a fewer number of the distributed coils 50 overlap the outside of each first outer slot 41 in the axial direction. Thus, at each coil end, a fewer number of the distributed coils 50 overlap the outside of the toroidal coil 15 arranged in each first outer slot 41.

The distributed coil 50 arranged in each second outer slot 42 is wound around the plurality of outer teeth 12 between the second outer slot 42 and only another one of the second outer slots 42. Thus, at each coil end, a further fewer number of the distributed coils 50 overlap the outside of the toroidal coil 15 arranged in each first outer slot 41. For this reason, with the configuration according to this embodiment, the coil ends are reduced. In FIG. 10, only the distributed coil 50 of one phase overlaps the inner portion of each of the first outer slots 41 surrounded by the broken-line ellipses β1, β2. This means that only the distributed coil 50 of one phase overlaps the outside of the toroidal coil 15 arranged in each first outer slot 41. This also applies to the coil 15 arranged in each first outer slot 41. Therefore, with the configuration shown in FIG. 10, the number of the distributed coils 50 that overlap each toroidal coil 15 at each coil end is reduced from three phase to one phase as compared to the configuration shown in FIG. 9, so the coil ends are reduced. The other configuration and operation are similar to those of the configuration shown in FIG. 8 and FIG. 9.

The embodiments of the disclosure are described above; however, the disclosure is not limited to the above-described embodiments. Various modifications are applicable.

What is claimed is:

1. A rotary electric machine comprising:
    an annular stator including a plurality of inner teeth and a plurality of outer teeth, the plurality of inner teeth protruding radially inward, the plurality of outer teeth protruding radially outward;
    an inner rotor facing a radially inner side of the annular stator;
    an outer rotor facing a radially outer side of the annular stator; and
    a toroidal coil arranged in each inner slot between any adjacent inner teeth and at least part of a plurality of outer slots, each outer slot is between adjacent two of the outer teeth,
    the total number of the plurality of outer slots is larger than the total number of the plurality of inner slots,
    the plurality of outer slots are configured such that a first outer slot and a second outer slot are alternately arranged in a circumferential direction, and the ratio of the total number of the plurality of outer slots to the total number of the plurality of inner slots is two to one,
    only the toroidal coil is arranged in each of the plurality of inner slots and the first outer slots, the first outer slots being the at least part of the plurality of outer slots,
    only a distributed coil is arranged in each of the second outer slots, and
    the number of the toroidal coils and the distributed coils arranged in all the outer slots is larger than the number of the toroidal coils arranged in all the inner slots.

2. The rotary electric machine according to claim 1, wherein
    each first outer slot is arranged at the same position in the circumferential direction as a corresponding one of the inner slots, and
    each second outer slot is arranged at a different position in the circumferential direction with respect to a corresponding one of the inner slots.

3. The rotary electric machine according to claim 2, wherein
    a flat wire coil having a rectangular cross section is arranged in each first outer slot as the toroidal coil, and
    a round wire coil having a circular cross section is arranged in each second outer slot as the distributed coil.

4. The rotary electric machine according to claim 1, wherein
    the first outer slots and the second outer slots are configured such that two of the first outer slots and two of the second outer slots are alternately arranged in the circumferential direction at the radially outer side of the annular stator.

5. The rotary electric machine according to claim 4, wherein
    the distributed coil arranged in each second outer slot is wound around a plurality of the outer teeth between the second outer slot and another one of the second outer slots.

* * * * *

UNITED STATES PATENT AND TRADEMARK OFFICE
CERTIFICATE OF CORRECTION

PATENT NO. : 10,873,226 B2
APPLICATION NO. : 15/879843
DATED : December 22, 2020
INVENTOR(S) : Masafumi Namba et al.

Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Nagakute" and insert --Nagakute-shi Aichi-ken--, therefor.

Item (72), inventor 2, city, delete "Nagakute" and insert --Nagakute-shi Aichi-ken--, therefor.

Item (72), inventor 3, city, delete "Nagakute" and insert --Nagakute-shi Aichi-ken--, therefor.

Item (72), inventor 4, city, delete "Okazaki" and insert --Okazaki-shi Aichi-ken--, therefor.

Item (72), inventor 5, city, delete "Toyota" and insert --Toyota-shi Aichi-ken--, therefor.

Item (73), assignee, city, delete "Toyota" and insert --Toyota-shi Aichi-ken--, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*